(12) United States Patent
Watanabe et al.

(10) Patent No.: US 9,393,747 B2
(45) Date of Patent: Jul. 19, 2016

(54) METHOD OF MANUFACTURING OPTICAL ELEMENT (71) Applicant: FUJIFILM CORPORATION, Tokyo (JP)

(72) Inventors: Seiichi Watanabe, Saitama (JP); Kazumi Koike, Saitama (JP); Takayuki Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/458,278

(22) Filed: Aug. 13, 2014

(65) Prior Publication Data

US 2014/0346692 A1    Nov. 27, 2014

Related U.S. Application Data (63) Continuation of application No. PCT/JP2013/057259, filed on Mar. 14, 2013.

(30) Foreign Application Priority Data

Mar. 29, 2012  (JP) .................................. 2012-078103

(51) Int. Cl.
*B29D 11/00* (2006.01)
*B29C 45/14* (2006.01)
(Continued)

(52) U.S. Cl.
CPC ........ *B29D 11/00009* (2013.01); *B29C 43/021* (2013.01); *B29C 43/14* (2013.01);
(Continued)

(58) Field of Classification Search
CPC ...... B29C 45/14; B29C 69/02; B29C 43/021; B29C 43/36; B29C 43/14; B29C 45/0003; B29C 45/1418; B29D 11/0009; B29D 11/00432

See application file for complete search history.

(56) References Cited

U.S. PATENT DOCUMENTS

2006/0284327 A1 * 12/2006 Yamamichi .................. 264/1.32
2014/0319707 A1   10/2014 Watanabe

FOREIGN PATENT DOCUMENTS

CN         101038348       9/2007
EP         1734015 A2      12/2006
(Continued)

OTHER PUBLICATIONS

International Search Report PCT/JP2013/057259 dated Jun. 25, 2013.
(Continued)

*Primary Examiner* — Mathieu Vargot
(74) *Attorney, Agent, or Firm* — Young & Thompson (57) ABSTRACT Disclosed is a method of manufacturing an optical element capable of increasing surface accuracy of an optical surface of an optical element with a plastic lens portion. A cavity which is formed when a pair of molds are closed has a compression molding space and an annular injection molding space, and the method includes a compression molding step of casting a compression molding material into the compression molding space of the molds and an injection molding step of injecting an injection molding material into the injection molding space in a state where the molds are closed and forming an injection molded portion at the outer circumferential edge of the compression molded compression molding material. In the injection molding step, before the compression molding material reaches a temperature lower than the glass transition temperature, the injection of the injection molding material starts.

13 Claims, 4 Drawing Sheets (51) Int. Cl.
*B29C 69/02* (2006.01)
*B29C 43/02* (2006.01)
*B29C 43/36* (2006.01)
*B29C 43/14* (2006.01)
*B29C 45/00* (2006.01)
*B29L 11/00* (2006.01)
*G02B 7/02* (2006.01)

(52) U.S. Cl.
CPC ............ *B29C 43/36* (2013.01); *B29C 45/0003* (2013.01); *B29C 45/14* (2013.01); *B29C 69/02* (2013.01); *B29D 11/00432* (2013.01); *B29C 45/1418* (2013.01); *B29C 45/14336* (2013.01); *B29L 2011/0016* (2013.01); *G02B 7/026* (2013.01)

(56) References Cited

FOREIGN PATENT DOCUMENTS

| | | |
|---|---|---|
| EP | 2805803 A1 | 11/2014 |
| JP | H02164730 A | 6/1990 |
| JP | 2007-022905 | 2/2007 |
| JP | 2008-155577 | 7/2008 |
| JP | 2009-137162 | 6/2009 |

OTHER PUBLICATIONS

Written Opinion of the International Searching Authority PCT/JP2013/057259 dated Jun. 25, 2013.

Chinese Office Action, dated Dec. 25, 2014, in corresponding Chinese Patent Application No. 201380007972.7.

Extended European Search Report dated Oct. 16, 2015; Appln. No. 13769420.4.

\* cited by examiner

METHOD OF MANUFACTURING OPTICAL ELEMENT

CROSS-REFERENCE TO RELATED APPLICATIONS

This application is a Continuation of PCT International Application No. PCT/JP2013/057259 filed on Mar. 14, 2013, which claims priority under 35 U.S.C. §119(a) to Japanese Patent Application No. 2012-078103 filed Mar. 29, 2012. Each of the above applications is hereby expressly incorporated by reference, in its entirety, into the present application.

BACKGROUND OF THE INVENTION

1. Field of the Invention

The present invention relates to a method of manufacturing an optical element.

2. Description of the Related Art

In recent years, apparatuses, such as a mobile phone and a digital camera, have been reduced in size and thickness every year, and an optical system of an imaging unit mounted in these apparatuses has been reduced in size and thickness. For this reason, when incorporating a lens constituting an optical system in a product, it has been suggested that an edge portion which becomes a frame body provided at the outer circumference of the lens is molded integrally with the lens, and the lens is incorporated in the product based on the edge portion. In this way, the edge portion and the lens are molded integrally, whereby an assembling step into a lens barrel or adjustment of the optical axis of the lens can be simplified.

JP2007-22905A describes a manufacturing method in which a glass preform is compression molded and cured to mold a lens portion, and then an edge portion is molded integrally at the outer circumference of the lens portion by injection molding.

SUMMARY OF THE INVENTION

With the reduction in size of the optical system, instead of glass, a plastic lens having a high degree of freedom in design is often manufactured, and high resolution of an image captured by an imaging unit is required. In order to cope with high resolution, high accuracy of the plastic lens is required along with optical design of the optical system.

According to JP2007-22905A, a plastic lens having a high degree of freedom in design may be used. However, in general, since plastic has a shrinkage rate greater than glass during curing, if the edge portion is molded integrally by the method disclosed in JP2007-22905A, surface accuracy of the optical surface of the lens is not satisfactory.

Accordingly, an object of the invention is to provide a method of manufacturing an optical element with a lens having satisfactory surface accuracy of an optical surface in an optical element in which an edge portion is molded integrally with a plastic lens.

There is provided a method of manufacturing an optical element which obtains an optical element with a plastic lens portion by molding machining using a pair of molds, in which a cavity which is formed when the pair of molds are closed has a compression molding space and an annular injection molding space connected to the outer circumferential edge of the compression molding space, the method includes a compression molding step of casting a compression molding material into the compression molding space of the molds and closing the molds in an atmosphere equal to or higher than the glass transition temperature of the compression molding material to transfer the transfer surfaces of the molds to the compression molding material, and an injection molding step of injecting an injection molding material into the injection molding space in a state where the molds are closed and forming an injection molded portion at the outer circumferential edge of the compression molded compression molding material, and in the injection molding step, before the compression molding material reaches a temperature lower than the glass transition temperature, the injection of the injection molding material starts.

According to the invention, when molding the edge portion integrally with the compression molded lens portion by injection molding, it is possible to prevent deterioration in surface accuracy of the optical surface of the lens portion using an injection pressure caused by the injection molding, and to stably manufacture a high-quality optical element.

DESCRIPTION OF THE PREFERRED EMBODIMENTS

Hereinafter, an embodiment of the invention will be described in detail referring to the drawings.

Figure 1:
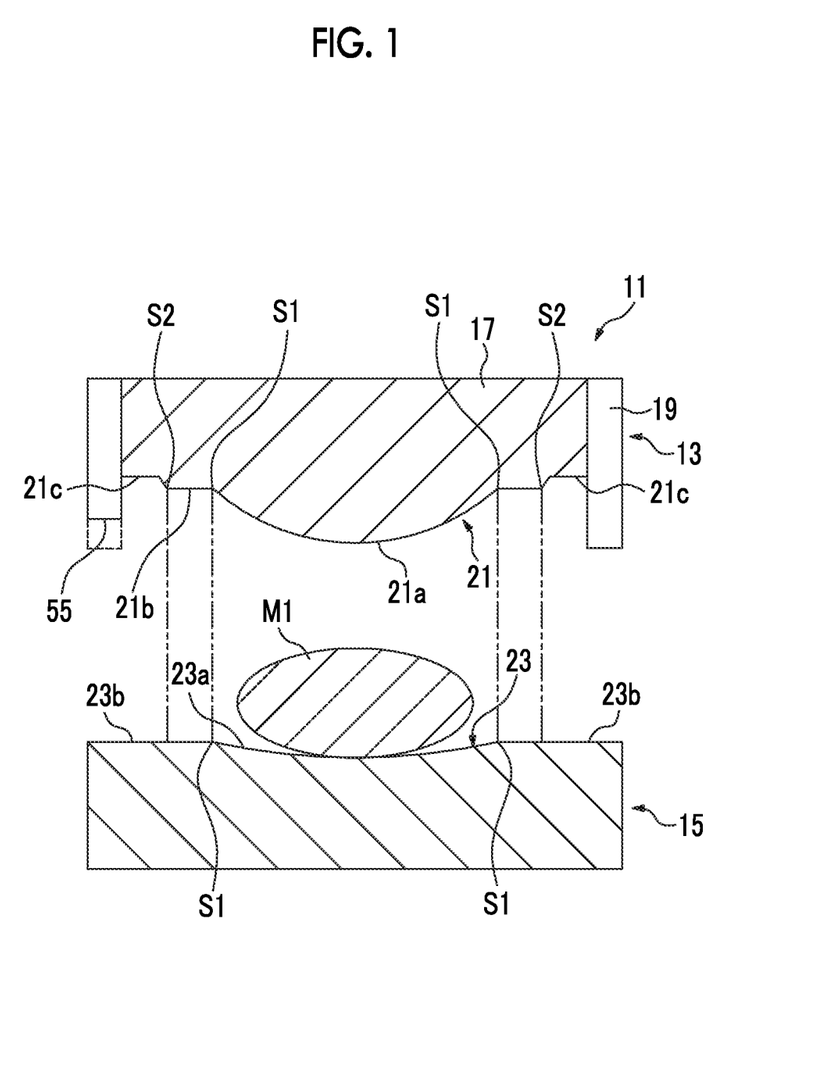
FIG. 1 is a diagram illustrating an embodiment of the invention and a schematic sectional view of a pair of molds which mold an optical element.
Figure 4:
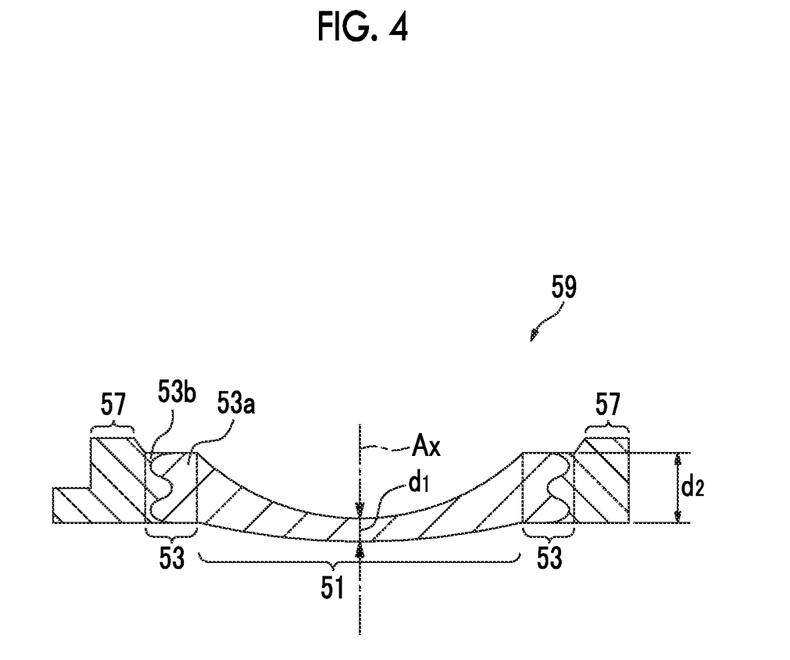
FIG. 4 is a sectional view showing an optical element molded in FIG. 3C.

FIG. 1 is a diagram illustrating an embodiment of the invention and a schematic sectional view of a pair of an upper mold 13 and a lower mold 15 which mold an optical element 59 (see FIG. 4).

A mold 11 includes a pair of an upper mold 13 and a lower mold 15, and is a mold which is provided to obtain an optical element 59 with a plastic lens portion 51 by molding machining using the pair of molds. A state shown in FIG. 1 is a state where a compression molding material M1 is placed in the lower mold 15. The compression molding material M1 is a preform having a substantially ellipsoidal shape made of thermoplastic resin.

The shape of the preform is not limited thereto. For example, a columnar shape or a substantially spherical shape may be used.

The upper mold 13 has a columnar core portion 17, and a substantially cylindrical trunk portion 19 into which the core portion 17 is internally inserted and which is fitted relatively movably to the core portion 17. The trunk portion 19 is in a state where part thereof is notched. In detail, an injection gate 55 which is provided to supply a thermoplastic injection molding material M2 described below is formed in the trunk portion 19. An upper mold transfer surface 21 and a lower mold transfer surface 23 which are provided to mold an optical element 59 from the compression molding material M1 are respectively formed in the upper mold 13 (core portion 17) and the lower mold 15.

The upper mold transfer surface 21 has a lens transfer surface 21a which is in a range on the inner circumference side of a circumferential boundary portion S1, a flange transfer surface 21b which is in a range on the outer circumferential side of the boundary portion S1 and on the inner circumferential side of a circumferential boundary portion S2, and an edge transfer surface 21c which is in a range on the outer circumferential side of the circumferential boundary portion S2.

The lens transfer surface 21a is a surface which is provided to form the optical surface of the lens portion 51. The flange transfer surface 21b is a surface which is provided to form the flange surface of a flange portion 53. The edge transfer surface 21c is a surface which is provided to form the edge surface of an edge portion 57.

The lower mold transfer surface 23 has a lens transfer surface 23a which is in orange on the inner circumferential side of the circumferential boundary portion S1, and a transfer surface 23b which is in a range of the outer circumferential side of the boundary portion S1.

The lens transfer surface 23a is a surface which is provided to form the optical surface of the lens portion 51. The transfer surface 23b is a surface which is provided to form both the flange surface of the flange portion 53 and the edge surface of the edge portion 57.

Like the edge transfer surface 21c, a step may be provided on the transfer surface 23b according to a desired optical element 59 such that the flange surface and the edge surface on the lower mold 15 side are different in height.

Like the transfer surface 23b, a step may not be provided on the edge transfer surface 21c according to a consumable optical element 59 such that the flange transfer surface 21b and the edge transfer surface 21c become a continuity of flat surface.

Figure 2:
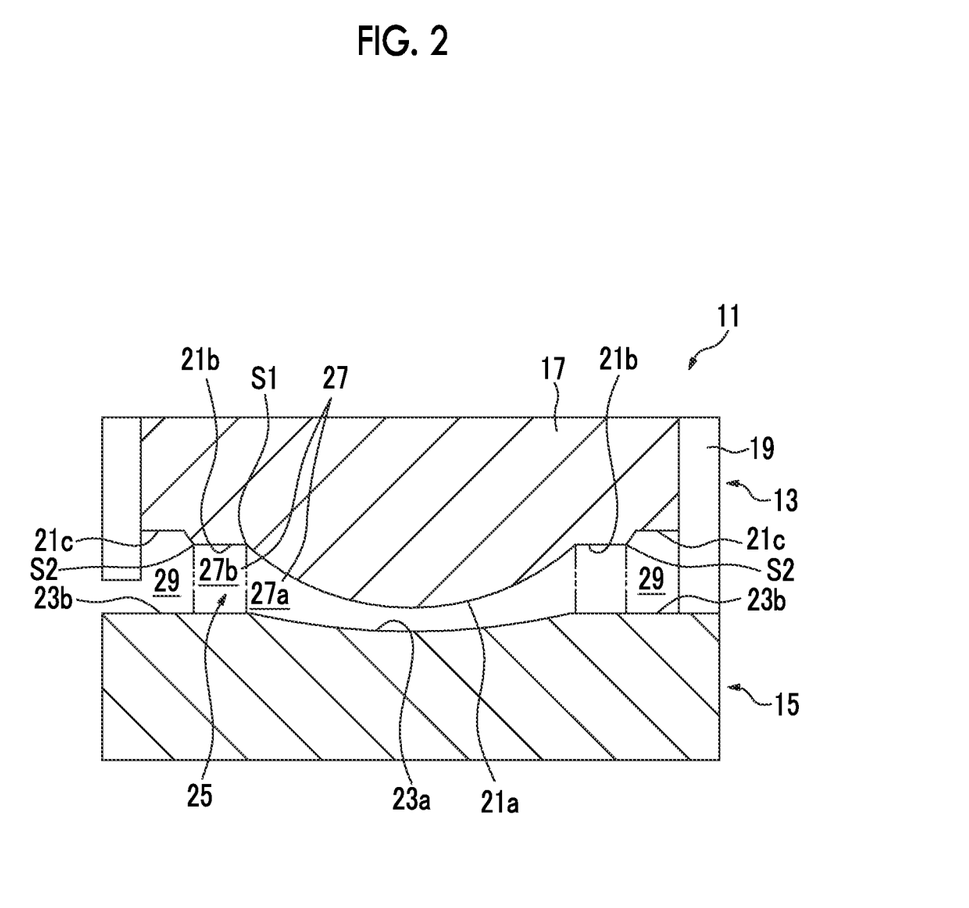
FIG. 2 is a sectional view showing a state where a pair of molds in FIG. 1 are closed.

FIG. 2 is a sectional view showing a state where the upper mold 13 and the lower mold 15 are closed.

In the upper mold 13 and the lower mold 15 in the mold closed state, a cavity 25 which becomes a space for forming an optical element 59 is defined between the upper mold transfer surface 21 and the lower mold transfer surface 23 arranged to face each other. The cavity 25 has a compression molding space 27, and an annular injection molding space 29 connected to the outer circumferential edge of the compression molding space 27. The compression molding space 27 is primarily defined between the lens transfer surface 21a and the lens transfer surface 23a, and the injection molding space 29 is defined between the edge transfer surface 21c and the transfer surface 23b.

The compression molding space 27 has an optical surface molding space 27a and an annular pushing compensation space 27b connected to the outer circumferential edge of the optical surface molding space 27a. The optical surface molding space 27a is defined between the lens transfer surface 21a and the lens transfer surface 23a, and the pushing compensation space 27b is defined between the flange transfer surface 21b and the transfer surface 23b.

In the mold closed state, a part of the upper mold 13 (a part of the trunk portion 19) and the lower mold 15 are brought into contact with each other, and the injection gate 55 is partitioned by the upper mold 13 and the lower mold 15.

Next, a compression molding step and an injection molding step using the mold 11 will be described.

Figure 3A:
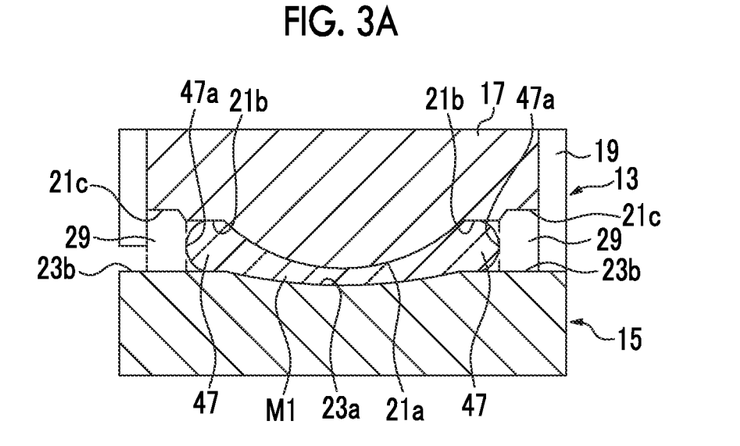
FIG. 3A, FIG. 3B, and FIG. 3C are a diagram showing a compression molding step and an injection molding step.
Figure 3B:
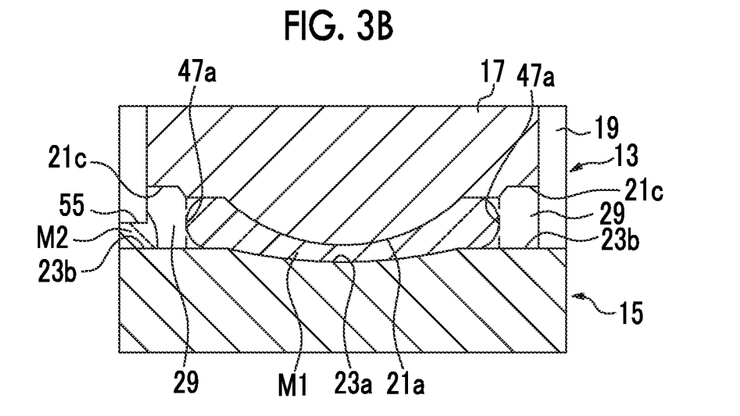
Figure 3C:
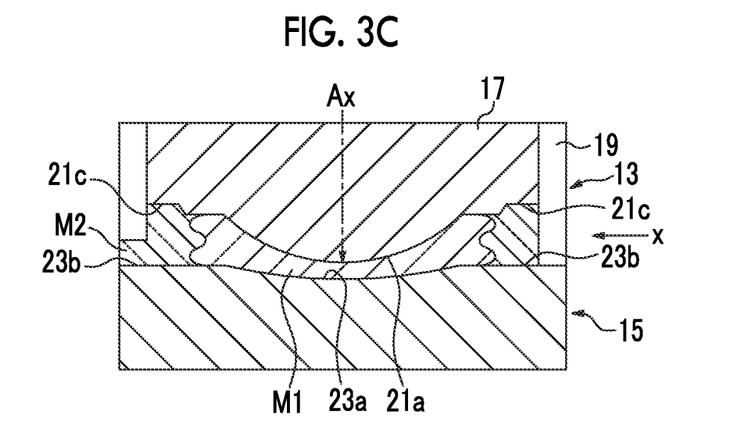

FIG. 3A, FIG. 3B, and FIG. 3C are a diagram showing a compression molding step and an injection molding step.

In the compression molding step, the compression molding material M1 is cast into the compression molding space 27, and the mold is closed in an atmosphere equal to or higher than the glass transition temperature of the compression molding material M1 to transfer the lens transfer surface 21a and the lens transfer surface 23a to the compression molding material M1. First, the upper mold 13 and the lower mold 15 are brought close to each other. Then, the lens transfer surface 21a is brought into contact with the compression molding material M1 placed in the lower mold 15. The compression molding material M1 is heated to be equal to or higher than the glass transition temperature, and the upper mold 13 and the lower mold 15 are brought closer to each other. Then, the compression molding material M1 is pressed inside the compression molding space 27, and the compression molding material M1 spreads along the lens transfer surface 21a and the lens transfer surface 23a. The compression molding material M1 spreads along the flange transfer surface 21b and the transfer surface 23b with pressing (FIG. 3A). If the upper mold 13 and the lower mold 15 are closed, the lens transfer surface 21a and the lens transfer surface 23a are sufficiently transferred to the compression molding material M1 in the mold closed state, an interface 47a (the outer circumferential edge of the compression molding material M1) of an outer circumferential portion 47 of the compression molding material M1 is formed by pressing. The interface 47a has a free curved surface. Apart of the interface 47a may be in contact with the outer circumferential edge of the compression molding space 27.

Subsequently, the injection molding step is executed.

In the injection molding step, in a state where the upper mold 13 and the lower mold 15 are closed, the injection molding material M2 is injected into the injection molding space 29 to form an injection molded portion on the interface 47a of the compression molded compression molding material M1. First, while the upper mold 13 and the lower mold 15 are closed, the injection of the injection molding material M2 from the injection gate 55 into the injection molding space 29 starts. FIG. 3B shows a state immediately after the injected injection molding material M2 starts to enter the injection molding space 29. Before the compression molding material M1 reaches a temperature lower than the glass transition temperature, the injection of the injection molding material M2 starts.

The injected injection molding material M2 goes around the outer circumferential edge of the compression molding material M1 through the injection molding space 29 and is coupled to the compression molding material M1 (FIG. 3C). At this time, a pressure is applied to the compression molding material M1 by the injection of the injection molding material M2, and the compression molding material M1 is deformed. As shown in FIG. 3C, a part of the interface 47a of the outer circumferential portion 47 protrudes toward an optical axis Ax of an optical element 59 to be molded. For this reason, a part of the injected injection molding material M2 enters the pushing compensation space 27b.

After the injection molding step, while the upper mold 13 and the lower mold 15 are closed, the integrated compression molding material M1 and injection molding material M2 are cooled and sufficiently cured (curing step). Thereafter, the molded optical element 59 is released from the upper mold 13 and the lower mold 15. In detail, the upper mold 13 is separated from the lower mold 15, and the core portion 17 of the upper mold 13 is relatively moved in the axial direction with respect to the trunk portion 19.

Through the above-described steps, the optical element 59 is removed.

FIG. 4 is a sectional view along the optical axis Ax of the optical element 59.

As shown in FIG. 4, the optical element 59 has the optical surface having the optical axis Ax. The optical element 59 includes a lens portion 51 which includes the optical axis Ax, an annular flange portion 53 which is formed at the outer circumferential edge of the lens portion 51, and an edge portion 57 which is formed at the outer circumferential edge of the flange portion 53.

The flange portion 53 has an inner flange portion 53a which is formed of the compression molding material M1, and an outer flange portion 53b which is formed of the injection molding material M2. The interface between the inner flange portion 53a and the outer flange portion 53b has a rugged shape. In detail, the interface has a shape in which a part protrudes toward the optical axis Ax and a shape in which the other part protrudes in a direction distant from the optical axis Ax.

As described above, according to the method of manufacturing the optical element 59, after the compression molding material M1 is compression molded, before the compression molding material M1 becomes equal to or lower than the glass transition temperature, the injection molding material M2 for molding the edge portion 57 is injected. Then, the injection pressure of the injection molding material M2 is applied to the compression molding material M1, and a force which pushes the compression molding material M1 to the inside acts on the compression molding material M1. With this, it is possible to prevent deterioration in surface accuracy of the optical surface of the optical element 59 which is likely to occur during the curing of the compression molding material M1.

Although the interface 47a of the compression molding material M1 is deformed by the injection pressure of the injection molding material M2, the pushing compensation space 27b for molding the flange portion 53 is provided, thereby absorbing the injection molding material M2 entering the space. For this reason, there is no influence on the optical performance of the optical surface of the lens portion 51. Since the formed interface of the inner flange portion 53a and the outer flange portion 53b has a complicated curved surface, the lens portion 51 and the edge portion 57 are rarely separated from each other by an impact or the like.

The injection of the injection molding material M2 may start simultaneously with the start of the curing step of the compression molding material M1. With this, since it is not necessary to adjust the injection start timing according to the material of the compression molding material M1, handling ability is improved.

At the time of the end of the injection molding step, that is, when the interface 47a of the compression molding material M1 is surrounded by the injection molding material M2 over the entire circumference, the temperature of the compression molding material M1 may be equal to or higher than the glass transition temperature. With this, deformation of the interface 47a in the circumferential direction of the compression molding material M1 is made uniform.

Before the injection molding step, a part of the compression molding material M1 may be swollen to the injection molding space 29 to form a swollen portion. This is useful for a case where it is not possible to secure the flange portion 53 to be large.

When the lens portion 51 has a concave lens shape, the effect of preventing deterioration in surface accuracy of the optical surface is high. This is because, in the case of a concave lens shape, a peripheral portion is thicker than a central portion including the optical axis Ax of the lens portion 51, and a pressing force during compression molding for the peripheral portion easily escapes to the outside.

When the thickness of the central portion of the optical surface molding space 27a (the thickness of the central portion including the optical axis Ax of the lens portion 51) is $d_1$, and the thickness of the pushing compensation space 27b (the thickness of the peripheral portion of the lens portion 51) is $d_2$, it is useful that the ratio $d_2/d_1$ is in a range of $1.2 \leq d_2/d_1 \leq 10$, and the thickness $d_1$ is in a range of $0.04 \text{ mm} \leq d_1 \leq 0.7 \text{ mm}$. The lens portion 51 of the optical element 59 formed in this range has a concave lens shape having large refractive power.

The outer flange portion 53b and the edge portion 57 may be non-transparent, and are preferably black. With this, the outer flange portion 53b has a light shielding function, and it is possible to increase the optical performance of the lens portion 51.

A step may not be provided on the edge transfer surface 21c, such that a geometrical step is not present between the pushing compensation space 27b and the injection molding space 29.

The invention is not limited to the above-described embodiment, and combinations of the respective configurations of the embodiment or alterations or applications by those skilled in the art, which are based on the description of the specification and the well-known techniques, are scheduled by the invention and still fall within the scope of the invention.

As described above, the following matters are disclosed in the specification.

(1) There is provided a method of manufacturing an optical element which obtains an optical element with a plastic lens portion by molding machining using a pair of molds, in which a cavity which is formed when the pair of molds are closed has a compression molding space and an annular injection molding space connected to the outer circumferential edge of the compression molding space, the method includes a compression molding step of casting a compression molding material into the compression molding space of the molds and closing the molds in an atmosphere equal to or higher than the glass transition temperature of the compression molding material to transfer the transfer surfaces of the molds to the compression molding material, and an injection molding step of injecting an injection molding material into the injection molding space in a state where the molds are closed and forming an injection molded portion at the outer circumferential edge of the compression molded compression molding material, and in the injection molding step, before the compression molding material reaches a temperature lower than the glass transition temperature, the injection of the injection molding material starts.

(2) In the method of manufacturing an optical element described in (1), in the injection molding step, the outer circumferential edge of the compression molding material is deformed by the injection of the injection molding material.

(3) In the method of manufacturing an optical element described in (1) or (2), the compression molding space has an optical surface molding space which is defined between the lens transfer surfaces of the pair of molds, and an annular pushing compensation space which is connected to the outer circumferential edge of the optical surface molding space, and the injection molding space is connected to the outer circumferential edge of the pushing compensation space.

(4) The method of manufacturing an optical element described in (3) further includes a curing step of curing the compression molding material, and the injection of the injection molding material starts simultaneously with the start of the curing step.

(5) In the method of manufacturing an optical element described in (3) or (4), when the injection molding material surrounds the outer circumferential edge of the compression molding material by injection over the entire circumference, the temperature of the compression molding material is equal to or higher than a glass transition temperature.

(6) In the method of manufacturing an optical element described in any one of (3) to (5), before the injection molding step, a part of the compression molding material is swollen to the injection molding space to form a swollen portion.

(7) In the method of manufacturing an optical element described in any one of (3) to (6), the lens portion has a concave lens shape.

(8) In the method of manufacturing an optical element described in (7), when the thickness of the central portion of the compression molding space in a stale where the molds are closed is $d_1$, and the thickness of the outer circumferential edge of the compression molding space is $d_2$, the ratio $d_2/d_1$ is in a range of $1.2 \leq d_2/d_1 \leq 10$, and the thickness $d_1$ is in a range of $0.04$ mm$\leq d_1 \leq 0.7$ mm.

(9) in the method of manufacturing an optical element described in any one of (3) to (8), the optical surface molding space is a space for molding the lens portion of the optical element, the pushing compensation space is a space for molding an annular pushing compensation portion formed at the outer circumferential edge of the lens portion, and the injection molding space is a space for molding an edge portion formed at the outer circumferential edge of the pushing compensation portion.

(10) In the method of manufacturing an optical element described in (9), the pushing compensation portion has a first portion formed of the compression molding material and a second portion formed of the injection molding material, and a part of the interface between the first portion and the second portion has a shape protruding toward the optical axis of the lens portion.

(11) In the method of manufacturing an optical element described in (10), the second portion is non-transparent.

(12) In the method of manufacturing an optical element described in any one of (3) to (8), a geometrical step is not present between the pushing compensation space and the injection molding space.

What is claimed is:

1. A method of manufacturing an optical element which obtains an optical element with a plastic lens portion by molding using a pair of molds,
    wherein a cavity which is formed when the pair of molds are closed has a compression molding space and an annular injection molding space connected to the outer circumferential edge of the compression molding space,
    the method comprises:
        a compression molding step of casting a compression molding material into the compression molding space of the molds and closing the molds in an atmosphere equal to or higher than the glass transition temperature of the compression molding material to transfer the transfer surfaces of the molds to the compression molding material; and
        an injection molding step of injecting an injection molding material into the injection molding space in a state where the molds are closed and forming an injection molded portion at the outer circumferential edge of the compression molded compression molding material, and
    in the injection molding step, before the compression molding material reaches a temperature lower than the glass transition temperature, the injection of the injection molding material starts,
    wherein the compression molding space has an optical surface molding space which is defined between the lens transfer surfaces of the pair of molds, and an annular pushing compensation space which is connected to the outer circumferential edge of the optical surface molding space,
    the injection molding space is connected to the outer circumferential edge of the pushing compensation space,
    the lens portion has a concave lens shape,
    when the injection molding material surrounds the outer circumferential edge of the compression molding material by injection over the entire circumference, the temperature of the compression molding material is equal to or higher than the glass transition temperature, and
    when the thickness of the central portion of the compression molding space in a state where the molds are closed is $d_1$, and the thickness of the outer circumferential edge of the compression molding space is $d_2$, the ratio $d_2/d_1$ is in a range of $1.2 \leq d_2/d_1 \leq 10$, and the thickness $d_1$ is in a range of $0.04$ mm$\leq d_1 \leq 0.7$ mm.

2. The method of manufacturing an optical element according to claim 1,
    wherein, in the injection molding step, the outer circumferential edge of the compression molding material is deformed by the injection of the injection molding material.

3. The method of manufacturing an optical element according to claim 1, further comprising:
    a hardening step of hardening the compression molding material,
    wherein the injection of the injection molding material starts simultaneously with the start of the hardening step.

4. The method of manufacturing an optical element according to claim 2, further comprising:
    a hardening step of hardening the compression molding material,
    wherein the injection of the injection molding material starts simultaneously with the start of the hardening step.

5. The method of manufacturing an optical element according to claim 2,
    wherein, when the injection molding material surrounds the outer circumferential edge of the compression molding material by injection over the entire circumference, the temperature of the compression molding material is equal to or higher than a glass transition temperature.

6. The method of manufacturing an optical element according to claim 3,
    wherein, when the injection molding material surrounds the outer circumferential edge of the compression molding material by injection over the entire circumference, the temperature of the compression molding material is equal to or higher than a glass transition temperature.

7. The method of manufacturing an optical element according to claim 1,
    wherein, before the injection molding step, a part of the compression molding material is swollen to the injection molding space to form a swollen portion.

8. The method of manufacturing an optical element according to claim 2,
    wherein, before the injection molding step, a part of the compression molding material is swollen to the injection molding space to form a swollen portion.

9. The method of manufacturing an optical element according to claim 3,
    wherein, before the injection molding step, a part of the compression molding material is swollen to the injection molding space to form a swollen portion.

10. The method of manufacturing an optical element according to claim 1,
    wherein the optical surface molding space is a space for molding the lens portion of the optical element, the pushing compensation space is a space for molding an annular pushing compensation portion formed at the outer circumferential edge of the lens portion, and the injection molding space is a space for molding an edge portion formed at the outer circumferential edge of the pushing compensation portion.

11. The method of manufacturing an optical element according to claim 10,
wherein the pushing compensation portion has a first portion formed of the compression molding material and a second portion formed of the injection molding material, and
a part of the interface between the first portion and the second portion has a shape protruding toward the optical axis of the lens portion.

12. The method of manufacturing an optical element according to claim 11,
wherein the second portion is non-transparent.

13. The method of manufacturing an optical element according to claim 1,
wherein a geometrical step is not present between the pushing compensation space and the injection molding space.

* * * * *